Patented Aug. 18, 1931

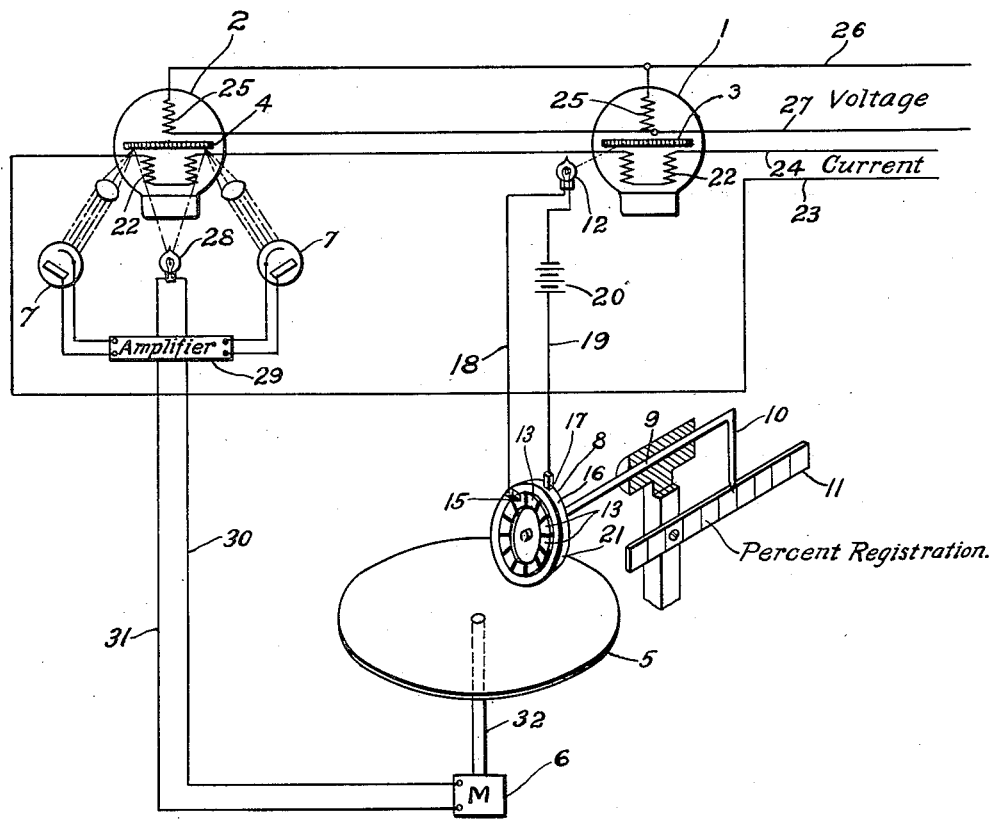

1,819,494

UNITED STATES PATENT OFFICE

SAMUEL ARONOFF, OF NEWARK, NEW JERSEY, ASSIGNOR TO WESTINGHOUSE ELECTRIC & MANUFACTURING COMPANY, A CORPORATION OF PENNSYLVANIA

METHOD OF AND MEANS FOR TESTING METERS

Application filed April 3, 1929. Serial No. 352,138.

My invention relates to methods of and means for obtaining the percent ratio of speed between a plurality of rotating elements, and more particularly to methods of and means for obtaining the percent speed or registration of the rotating element of a watthour meter as compared with a standard watthour meter.

Practically every watthour meter now manufactured is tested by the manufacturer before being shipped and also by the purchaser after shipment. One of such tests comprises comparing the speed of rotation of the armature of the meter under test with the armature of a standard watthour meter at different values of load, both of said meters being connected to the same load.

My invention has for an object, to provide a method of and means for quickly and accurately determining the percent speed ratio between the rotating elements of the standard meter and the test meter for all values of load imposed on the meters.

Briefly, my device comprises, a plurality of coacting members having a variable radius of contact, means for turning one of said members in accordance with the speed of the armature of the standard meter, and means for changing the radius of contact between the coacting members until the speed of the other member is proportional to the speed of the armature of the test meter. The radius of contact is provided with a scale calibrated in percent speed ratio or percent registration for indicating such property of the test meter.

My invention may be more readily understood, however, if the accompanying drawing is referred to in connection with the following description.

The single figure of the accompanying drawing is a view, partially schematic, in perspective, of apparatus constructed in accordance with my invention.

It is to be noted, in connection with my invention, that no external load for the testing apparatus is imposed on the moving system of either the test or the standard watthour meter because I utilize stroboscopic means for rotating one of the elements in accordance with the speed of the armature of one meter and stroboscopic means for comparing the speed of the other rotating member with the speed of the armature of the test meter.

As illustrated in the drawing, a meter 1 to be tested and a standard meter 2 are respectively equipped with stroboscopic armature discs 3 and 4 that are provided with equispaced, parti-colored lines around their peripheral edges. The number of marks on the disc of the test meter is preferably equal to the number of marks on the disc of the standard meter. A member 5, preferably in the form of a disc having a flat surface, is rotated in accordance with the speed of the armature disc 4 of the standard meter 2 by means of a synchronous motor 6 which is, in turn, operated by a photo-electric cell 7 associated with the armature disc 4 of the standard meter 2.

The speed of the disc 5 is made directly proportional to the speed of the armature 4 by means of the photo-electric cell 7 and the synchronous motor 6 which is described in my copending application, Serial No. 352,141.

A friction wheel 8 is mounted to directly coact with the disc 5 and be rotated thereby in accordance with the speed of rotation of said disc and its position with respect to the radius of the disc. To this end, the member 8 is preferably journaled on one end of a longitudinally movable shaft 9 that is provided, at its other end, with a pointer or indicator 10. A scale 11, preferably calibrated in percent speed or percent registration, is mounted to coact with the pointer 10 to give an indication of the position of the member 8 with respect to the radius of the member 5. It will be apparent that, if the disc 5 is rotating at a constant speed, the speed of the wheel 8 may be changed by changing its position with respect to the radius of the disc. The wheel 8 will rotate at a maximum speed near the periphery of the disc 5 and at a minimum or zero speed when it is exactly in the center of the disc.

The speed of the wheel 8 may be compared with the speed of the rotating armature 3 of the test meter 1 in any suitable manner, as, for example, by means of the stroboscopic effect between a gas-filled, preferably neon, electric lamp 12 and the marks on the armature disc 3. When the lamp 12 is energized in accordance with the speed of rotation of the wheel 8, the latter is provided with commutator segments 13 to be engaged by a brush 15.

The wheel 8 is preferably made of conducting material which, in addition to being turned in accordance with the speed of the member 5, forms a contacting surface 16 for another brush 17. The lamp 12 is connected in series-circuit relation with the brushes 15 and 17 by means of conductors 18 and 19 through a source of direct current 20 which may be a battery. Each time the brush 15 engages an insulating segment 21, the lamp 12 is darkened and each time the brush engages a conducting segment 13, the lamp 12 is lighted.

The lamp 12 is arranged with respect to the disc 3 in such manner that, when the speed of the rotating member 8 is equal to the speed of the disc 3, the stroboscopic effect of the flickering light from the lamp 12 on the periphery of the disc 3 causes the stroboscopic lines on the disc to appear stationary.

The series windings 22 of the watthour meters are connected in series-circuit relation by means of current conductors 23 and 24, and the voltage windings 25 of the watthour meters are connected in parallel-circuit relation to voltage conductors 26 and 27. The current conductors 23 and 24 and the voltage conductors 26 and 27 are connected, respectively, in series-circuit relation to a source of electric supply and a variable load, and in parallel-circuit relation to the supply and load (not shown).

The test meter 1 is connected to measure exactly the same load as the standard meter 2. The rotation of the armature 3 of the test meter should, therefore, be exactly equal to the speed of rotation of the armature 4 of the standard meter 2 at all values of load. Any deviation from the same speed by the armatures 3 and 4 may be read in terms of the percent difference in ratio between the two speeds. With the armature 4 as a standard, it may be read by observing the position of the pointer 10 with respect to the scale 11, when it is, as mentioned above, suitably calibrated.

The lamp 28 throws a steady beam of light on the periphery of the disc 4 and the intermittent reflection of such beam of light on the photo-electric cell 7 operates the latter each time a mark on the periphery of the disc 4 interrupts the reflected beam of light from the lamp 28. The energization of the photo-electric cell 7 is amplified by an amplifier 29 and transmitted through conductors 30 and 31 to the synchronous motor 6, that, as indicated above, rotates in accordance with the rotation of the armature disc 4. The rotating member 5 is preferably mounted on the shaft 32 of the synchronous motor 6, but it will be understood that any suitable arrangement may be provided for rotating the member 5 by the synchronous motor 6.

For any given load, the percent registration of the test meter 1 with respect to the standard meter 2 may be obtained by manually adjusting the position of the shaft 9 until the stroboscopic lines on the disc 3 appear to be stationary. The percent registration of the meter 1 may be then read directly from the scale 11. This process is followed for the whole range of different load values.

It will be appreciated by those skilled in the art that my device provides means for attaining the percent registration of a meter in a simple, quick and accurate manner. The accuracy of the device may be readily checked by synchronizing the flicker of the lamp with the rotation of the standard disc 4.

With my device, the calibration, performance and general routine checking of watthour meters in the laboratories of both the factory and the public-service companies may be effected, rapidly, accurately and economically because of elimination of the time element involved in other methods of meter testing.

While I have shown the synchronous photo-electric-cell means in combination with a synchronous motor for rotating the member 5, I wish it understood that it is possible to use other means for rotating the member 5 in accordance with the rotation of the armature 4 without departing from the spirit of my invention. Also, means other than stroboscopic means may possibly be substituted for comparing the speed of the rotating member 5 with the speed of the disc of the test meter without changing the essence of my invention.

Since various other modifications may occur to those skilled in the art, I wish my invention to be limited only by the prior art and the scope of the appended claims.

I claim as my invention:

1. Means for indicating a function of the speed ratio of a plurality of rotating elements, comprising a plurality of coacting members having a variable radius of contact, means for turning one of said members in accordance with the speed of one of said elements, and means for changing said radius of contact until the speed of the other member is proportional to the speed of the other element, said radius of contact having a scale calibrated in a function of percent speed ratio associated therewith.

2. The method of obtaining the percent ratio of speed of a rotating element, as compared with another rotating element, which comprises turning a member having a plane surface in accordance with the speed of rotation of one of said elements, varying the radial position of a wheel coacting with said plane surface until the speed of said wheel is proportional to the speed of said second element and determining the position of the wheel on the plane surface.

3. In combination, a first meter having a rotating element, a first member, means for rotating said first member in accordance with the speed of rotation of said element, a second member coacting with said first member and driven thereby, means for varying the speed of said second member by changing its radial position with respect to said first member, a second meter having a rotating element, and means for comparing the speed of said second member with the speed of the element of said test meter.

4. In combination, two independently rotating elements and means for obtaining the ratio between the speeds of said elements comprising two directly coacting members relatively movable with respect to each other, means for turning one of said members in accordance with the speed of rotation of one of said elements, means for comparing the speed of the other of said members with the speed of the other of said elements, and means for adjusting the speed of said other member by changing its radial position with respect to said one member to rotate in accordance with the speed of said other element.

5. Means for obtaining a function of the speed ratio betwen two rotating elements, comprising a plurality of coacting members having a variable radius of contact, means for turning one of said members in accordance with the speed of one of said elements without imposing a load on said element, and means for changing said radius of contact until the speed of the other member is proportional to the speed of the other element, said means having a scale associated therewith calibrated in a function of the speed ratio.

6. A standard watthour meter, a test watthour meter connected in electric-circuit relation to said standard watthour meter, and means for obtaining the percent registration of said test meter with respect to said standard meter comprising two coacting members having means for changing the speed of one of said members with respect to the speed of the other of said members, means for driving one of said members in accordance with the registration of a standard meter, means for comparing the speed of the other of said members with the registration of said test meter, so that the position of said other member may be manually changed to rotate in accordance with the speed of said test meter, and means calibrated in percent registration for indicating the relative position of said other member.

7. In combination, a standard watthour meter and a test watthour meter connected in electric-circuit relation, the armatures of both of said meters being marked with stroboscopic lines, a rotating member, means, including a synchronous motor and a photoelectric cell, for rotating said member in accordance with the speed of said standard armature, a wheel driven by said rotating member having means associated therewith for changing its position with respect to the radius of said member so that the speed of the latter may be changed, a lamp, means for lighting said lamp intermittently in accordance with the speed of rotation of said second member, said lamp being positioned near the stroboscopic marking of the armature of said test meter, whereby a comparison between the speeds of said second member and said armature may be made, and means calibrated in terms of the percent registration of said test member with respect to said standard meter associated with said second member.

In testimony whereof, I have hereunto subscribed my name this 9th day of March, 1929.

SAMUEL ARONOFF.